May 26, 1942.  L. R. WILLIAMSON  2,283,961
PRESSURE BOOSTER UNIT
Filed June 9, 1938

INVENTOR.
Larkin R. Williamson
BY
Ray, Oberlin & Ray
ATTORNEYS.

Patented May 26, 1942

2,283,961

UNITED STATES PATENT OFFICE 2,283,961

PRESSURE BOOSTER UNIT

Larkin R. Williamson, Cincinnati, Ohio, assignor to E. W. Bliss Company, Brooklyn, N. Y., a corporation of Delaware Application June 9, 1938, Serial No. 212,721

2 Claims. (Cl. 60—54.6)

This invention relates to a pressure booster unit analogous to a pump by which the fluid pressure in a fluid transmission system is varied at the will of the operator. The invention is more particularly concerned with a unit by which the pressure in the system can be built up to actuate any mechanism coupled thereto and the pressure then maintained at a built-up value during the normal operation of the mechanism. Thereafter the pressure may be released to render the system inactive.

Pressure booster units have in general been subject to several disadvantages. In the first place it has been necessary to intermittently actuate the unit during a prolonged period of operation of the mechanism it controlled to maintain the requisite operating pressure in the system in spite of any minute leaks therein and especially leaks at glands and other packed joints. With pressure applying mechanism heretofore used it has been difficult to rapidly move the parts at a low pressure up to the point at which the controlled mechanism becomes effective and thereafter to follow the first movement with a rapid build up in fluid pressure during the relatively small movement of the controlled parts to effect complete connection.

The disadvantages set out above and other objections present in the units heretofore built have rendered it difficult to satisfactorily engage driving units as clutches and brakes rapidly and without chatter, especially when the driving units handled large loads. This has been especially true with driving clutches and brakes for presses and other like equipment.

With the foregoing in mind it has been the chief object of my invention to design a pressure booster mechanism by which the fluid pressure can act at a relatively low rate of pressure increase to shift the controlled parts to the point of actual driving engagement and thereafter move the parts the slight distance necessary for complete engagement at a greatly increased pressure. Another object of the invention has been to devise a booster unit which will automatically compensate for the slight drop occurring throughout the system due to leakage over an extended period of use. An additional object has been to provide a booster mechanism which is self-locking after the desired operating pressure is attained and in which no further driving force acting on the booster is needed to maintain such operating pressure.

Other objects of my invention will become apparent from the following description, read in the light of the accompanying drawing, and the novel features thereof are summarized in the claims.

Figure 2:
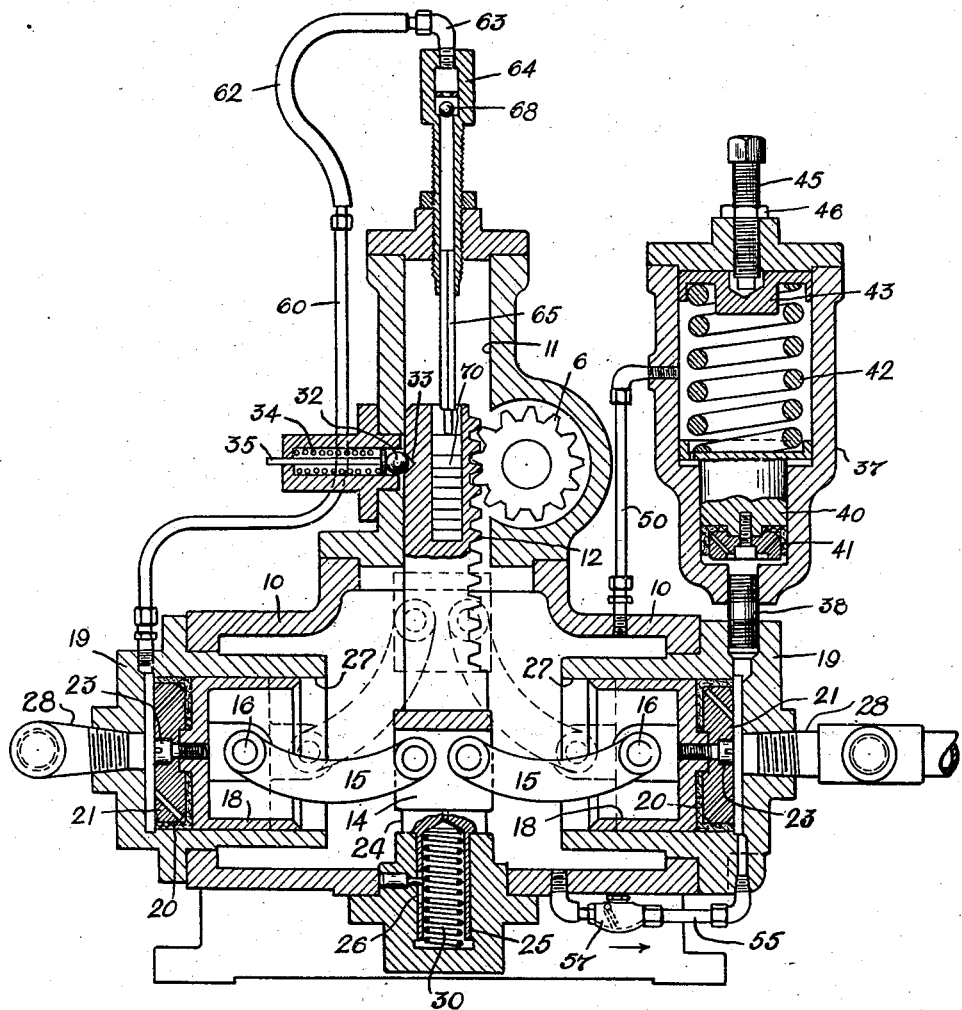
Fig. 2 is a transverse section through Fig. 1 as indicated by the line 2—2 thereon.

The booster unit in general comprises a pair of opposed pistons which are interconnected as shown in Fig. 2, to function as a unit in applying fluid pressure to a mechanism to be operated. They are controlled through a single rack connected to each piston by a toggle link. The rack is shifted vertically of movement of the pistons by a pinion, which in turn is driven by a reversible electric motor.

Figure 1:
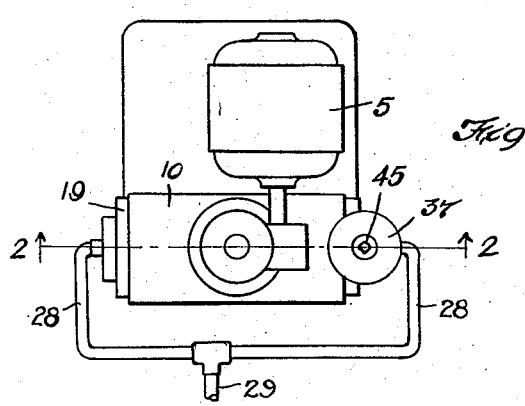
Fig. 1 is a plan view of my booster unit and a driving motor therefor.

This motor, indicated in Fig. 1 at 5, carries a pinion 6 (Fig. 2) on the rotor shaft, which shaft is journaled in the pump casing 10. The pinion protrudes into a vertical elongated rack slide 11, in which is carried a vertically shiftable rack 12. At its lower end the rack 12 is forked as indicated at 14 and within the fork are pivotally mounted two toggle members 15 which at their outer ends are pivotally secured as at 16 to pump pistons 18.

These pistons 18 are slidably mounted in cylinders 27 formed within end members 19. Pipe lines 28, as seen in Fig. 1, lead from each cylinder to a common conduit 29, which communicates with the mechanism to be supplied with fluid pressure. Leakage between the pistons and the cylinders is prevented by packing diaphragms 20 secured in place by packing rings 21, bolted as at 23 to the pistons.

From the description so far given it will be apparent that as the pinion moves the rack 12 downwardly a toggle action is established which forces the two pistons 18 away from each other. Due to this action the pistons move rapidly until the rack is almost at the end of its stroke. At this time, due to the nearly horizontal position of the arms 15, the movement of the pistons slows down greatly. This novel principle is employed to more advantageously apply fluid pressure to the mechanism actuated by the fluid in the system. It functions to rapidly decrease the volume in which the fluid is confined and to take up the play between the parts until the instant prior to actual driving engagement of the parts by the increasing fluid pressure.

The toggle arms 15, then being almost straight, apply the actual operating force at a greatly increased pressure very slowly and thus the ordinary shock at the time of engagement is eliminated. To hold the pistons in an extended position the rack is driven downwardly to carry the toggle arms past dead center and thus employ the fluid pressure of the system to hold the rack down against a cushion carried in the base. For various reasons later discussed, the total volume of the fluid system may be varied and, to the same end, the system is adjustable to permit the aforesaid advantageous toggle action to be set up at the precise time desired.

To thus cushion the downward movement of the rack 12 a cushion plate 24, including a piston 25, is mounted beneath the rack 12. The piston is restrained against rotation by a pin in a slot 26 in the piston. A small hole is provided centrally in the plate 24 to permit fluid to enter the cylinder therebeneath and to permit its egress. The result is a dashpot effect when the lower end of the fork strikes the plate. As the toggle moves past dead center it assumes a position on top of the cushion as shown in Fig. 2 and as above indicated is retained in this position by the pressure in the system tending to force the pistons inwardly. After the fork 14 is raised to release the pressure in the system a spring 30 returns the cushion plate to an upward position and allows fluid to refill the cylinder therebeneath in preparation for the next action.

To prevent chatter of the rack 12, when the pistons are shifted to the solid line position of Fig. 2, distinguished from the dotted line position, a spring and ball lock is provided. This comprises a ball 32 which, in the aforesaid position, lies within a groove 33 of the rack and is held thereagainst by a compression spring 34 bearing against the head of a push-rod 35, which in turn is journaled in a hollow cap secured to the pump casing. Pressure of the spring is sufficient only to prevent rattling and is not intended to replace the pinion 6 at any stage in the operation.

The machinery operated by the fluid system of my invention may normally be in operation for considerable periods of time. Under such conditions the fluid system, being subject to various minute leaks, gradually suffers a decrease in operating pressure which in operating mechanism heretofore used had to be built up to normal at regular intervals. One of the features of my invention is mechanism by which the desired operating pressure is continuously maintained over long periods without the necessity of replenishing the system.

This pressure maintaining mechanism is shown in Fig. 2 and is mounted within a subcasing 37 supported on an end member 19 by a hollow threaded nipple 38. Within the casing is a piston 40 provided with packing 41 and normally retained in a downward position by a strong compression spring 42. At its upper end the spring engages a ring 43 which may be adjustably positioned in the casing by a bolt 45 and locked in place in any adjusted position by a lock nut 46. As it is impossible to make the piston and packing absolutely fluid tight, a line 50 leads from the interior of the casing 37 back into the main casing 10 to prevent excessive accumulation of liquid beyond the piston 40.

The pressure to be maintained in the operating portions of the mechanism is, as above indicated, determined by the compression of the spring 42 under the influence of the bolt 45. As the pistons 18 are separated by downward movement of the rack fluid pressure is built up in the system and moves the piston 40 upwardly against the spring 42. The tendency of the spring to return the piston to its normal position compensates for leakage in the oil line and maintains a normal operating pressure therein equivalent to the expansive force exerted by the spring 42. Since the leakage in any event is very small the loaded spring 42 will maintain normal operating pressure in the system for long periods of time. When my invention is used with presses it is possible to move the rack 12 downwardly and establish pressure in the system and thus, under the influence of the aforementioned spring, maintain the desired operating pressure all day.

To counteract the continued passage of additional fluid to the system with each stroke a line is provided to pass fluid from the system back into the case. This line also provides lubrication for the rack and pinion. To this end a fluid line 60 is provided which threadingly connects with the interior of the fluid system at one of the end members 19. The other end of the line is secured to a flexible tube 62 which in turn is secured to a nipple 63 threadingly connected to a hollow bolt member 64 adjustably received in the cap of the casing 10. A rod 65 is normally slidable in the opening of the threaded member 64 and when the pistons are in the retracted position shown by the dotted lines in Fig. 2, the rod moves upwardly and opens a ball check valve member 68. Spacers 70 lie within a recess in the rack and provide an adjustable seating for the lower end of the rod 65. When the pistons are in the position shown in heavy lines in Fig. 2 the ball valve is closed and pressure is maintained in the system. When the pistons are retracted the ball valve is raised and any excess oil in the system falls down into the casing and in passing over the rack and pinion lubricates the same and other parts.

To maintain the proper volume of oil or fluid in the system it is desirable to provide means for feeding oil through the pistons from the interior of the casing into the system. This, as shown, consists of a line 55, including a check valve 57 and leading from one side of the pistons to the other. The check valve permits passage of fluid as indicated by the arrow and similarly prevents its return in the opposite direction. Thus, each time the pistons are moved to decrease the pressure in the system the check valve opens and some fluid is drawn therepast into the system from the casing.

The features just described permitting variation in the volume of fluid in the actual pressure line, will in operation be set to provide just sufficient fluid in the system to engage the parts when the toggle is almost straight. The effect is to rapidly build up the pressure to move the parts into actual engaging position and then much more slowly (due to the toggle action) and with considerably greater force, effect the actual engagement.

From the foregoing description it will be apparent that I provide a neat and compact pressure booster mechanism which is susceptible to a variety of uses where fluid pressure is utilized in accomplishing work and that the same may be used for purposes other than engaging driving parts as a clutch or brake, although this is the preferred manner of use.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:

1. A toggle fluid pressure booster unit comprising a case having a cylinder therein, a piston in said cylinder, a member shiftable transversely to the axis of said cylinder, a link connecting said member and said piston, a dash-pot cushion abutment positioned to be engaged by said member and lying to one side of the cylinder axis and means to shift said member across said cylinder axis and against said abutment whereby the toggle is locked against further movement in the direction towards said abutment.

2. A fluid pressure booster unit comprising a case having a fluid pumping cylinder therein, a piston in said cylinder, means comprising a rack and pinion for actuating said piston, a conduit communicating with the liquid pumping end of said cylinder to divert a portion of the pumped liquid and discharging the same against said means.

LARKIN R. WILLIAMSON.